(12) United States Patent
Williamson

(10) Patent No.: US 7,748,101 B2
(45) Date of Patent: Jul. 6, 2010

(54) METHOD AND APPARATUS FOR FORMING A METALLIC CONTAINER

(75) Inventor: James T. Williamson, Urbana, OH (US)

(73) Assignee: IP Technologies Holdings, LLC, Urbana, OH (US)

( * ) Notice: Subject to any disclaimer, the term of this patent is extended or adjusted under 35 U.S.C. 154(b) by 1192 days.

(21) Appl. No.: 11/313,111

(22) Filed: Dec. 20, 2005

(65) Prior Publication Data

US 2007/0137019 A1  Jun. 21, 2007

(51) Int. Cl.
  B21D 39/00 (2006.01)
  B21D 39/03 (2006.01)
  B23P 19/02 (2006.01)
  B23P 21/00 (2006.01)
  B23K 1/06 (2006.01)
  B23K 20/12 (2006.01)
  B25B 27/14 (2006.01)

(52) U.S. Cl. ........................ 29/521; 29/281.1; 29/281.5; 29/428; 29/505; 29/773; 228/1.1; 228/2.1; 228/2.3; 228/110.1; 228/112.1; 228/114.5

(58) Field of Classification Search ................ 29/281.1, 29/281.5, 428, 505, 521, 525, 773; 220/254.1, 220/713, 906; 228/1.1, 2.1, 2.3, 110.1, 112.1, 228/114.5, 154

See application file for complete search history.

(56) References Cited

U.S. PATENT DOCUMENTS

| | | | |
|---|---|---|---|
| 3,184,841 A | 5/1965 | Jones et al. .................... 29/470 |
| 3,306,488 A | 2/1967 | Lemelson |
| 3,732,613 A * | 5/1973 | Steigerwald ............. 228/112.1 |
| 3,899,116 A | 8/1975 | Mims |
| 4,036,397 A | 7/1977 | Walraven et al. |
| 4,047,657 A | 9/1977 | Mims ......................... 228/103 |
| 4,247,346 A * | 1/1981 | Maehara et al. ............ 156/73.5 |
| 4,496,095 A | 1/1985 | Renshaw et al. ............ 228/102 |
| 4,749,437 A | 6/1988 | Welter |
| 4,767,492 A | 8/1988 | Fukusima et al. ........... 156/580 |
| 4,892,227 A | 1/1990 | MacLaughlin |
| 5,082,160 A | 1/1992 | Leigh ......................... 228/110 |

(Continued)

FOREIGN PATENT DOCUMENTS

FR        1320632        1/1963

(Continued)

Primary Examiner—David P Bryant
Assistant Examiner—Alexander P Taousakis
(74) Attorney, Agent, or Firm—Brinks Hofer Gilson & Lione

(57) ABSTRACT

A method of forming a metallic container includes the steps of providing body and lid portions, placing the body and lid portions together, keeping portions of the body and lid portions in contact with one another, and reciprocally rotating the lid portion with respect to the body portion, thereby generating frictional heat and forming a friction weld therebetween. An apparatus for attaching the lid and body portions of a metallic container includes a base to support the body, a support assembly to support a flange of the body, and a sonitrode for contacting a flange of the lid, wherein the flanges of the lid and body are held together between the support assembly and the sonitrode. A motor reciprocally rotates the sonitrode relative to the support assembly, thereby moving the flanges relative one another to generate frictional heat and create a friction weld therebetween.

18 Claims, 8 Drawing Sheets

U.S. PATENT DOCUMENTS

| | | |
|---|---|---|
| 5,085,719 A | 2/1992 | Eck .................. 156/73.4 |
| 5,096,052 A | 3/1992 | Raque et al. |
| 5,279,625 A | 1/1994 | O'Neil-Bell |
| 5,345,747 A | 9/1994 | Raque et al. |
| 5,697,545 A * | 12/1997 | Jennings et al. ......... 228/112.1 |
| 5,739,215 A | 4/1998 | Westerhof et al. |
| 5,830,300 A | 11/1998 | Suzuki et al. ........... 156/73.1 |
| 6,032,835 A | 3/2000 | Burt |
| 6,802,920 B2 | 10/2004 | Shinohara et al. ........ 156/73.1 |
| 6,860,412 B1 | 3/2005 | Burt |
| 7,448,184 B2 | 11/2008 | Clark et al. ............... 53/453 |
| 7,497,917 B2 | 3/2009 | Chen et al. ............. 156/73.5 |
| 2003/0021920 A1 | 1/2003 | Williamson et al. |
| 2003/0113416 A1 * | 6/2003 | Wycliffe et al. ........... 426/131 |

FOREIGN PATENT DOCUMENTS

| | | |
|---|---|---|
| JP | 4201236 | 7/1992 |
| WO | WO 95/23668 | 9/1995 |

* cited by examiner

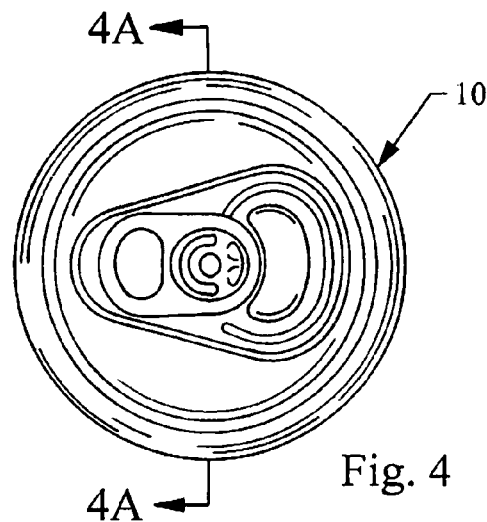
Fig. 4
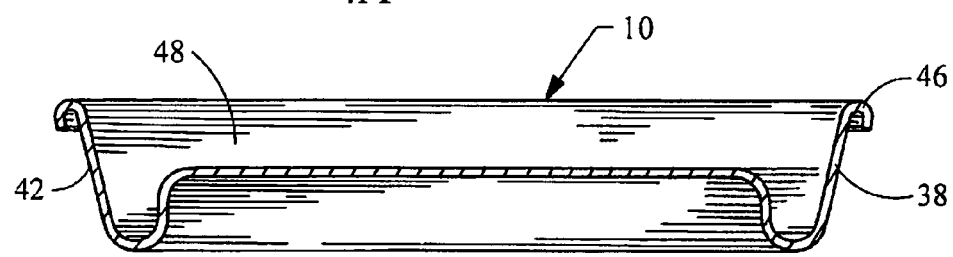
Fig. 4A
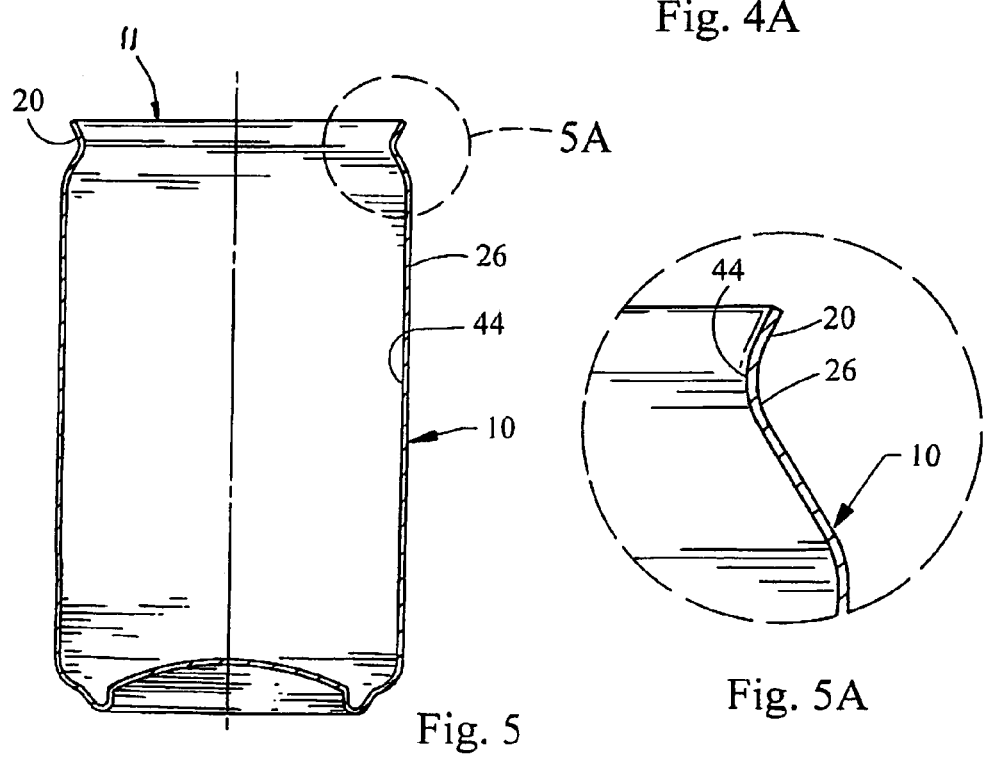
Fig. 5
Fig. 5A

METHOD AND APPARATUS FOR FORMING A METALLIC CONTAINER

BACKGROUND

1. Field of the Invention

The invention generally relates to a method an apparatus for attaching the lid portion to the body portion of a metallic container, particularly a metallic food container such as an aluminum beverage can.

2. Background of the Invention

Metallic containers, particularly those intended for food products, must be structurally robust, be made from materials compatible with food products, and generally incorporate internal coatings to make them suitable for food contents. Generally, metallic food containers, such as carbonated beverage cans, have a pre-formed body portion and a pre-formed lid portion that is attached to the body portion after the beverage is placed therein. The body portion is usually formed from a single piece of suitable metallic material, such as aluminum, and is shaped by stamping, drawing, ironing, and/or other suitable metal forming process. The lid portion is formed in much the same manner. The body portion can be very thin after forming, and therefore, the lid portion desirably contributes to the structural rigidity for the finished container. The lid portion can be made from a material that is relatively harder than the body portion.

One known method of attaching the lid portion onto the body portion of the metallic container involves rolling or curling parallel flange portions of the lid and the body portion onto each other to form a lip seam. This process generally provides a good seal, and does not compromise the integrity of any coatings that may be placed on the interior of the metallic container. A variety of coatings can be used on the interior surfaces of the lid portion and the body portion of the container, which are preferably satisfactory for food contact, to prevent corrosion of the inner surface of the metallic food container and to prevent the metal from contaminating the taste of the food placed therein. The coating can be any of the materials identified, for example, in U.S. Pat. No. 5,739,215, which are hereby incorporated by reference. Typically, the body portion and the lid portion have the inner surfaces coated prior to the lid portion being attached to the body portion. Therefore, any attachment technique must account for and accommodate the coating.

By rolling the edges of the lid portion and the body portion onto one another, a tight seal is formed, and the coating is not compromised. However, this method of attachment requires extra metallic material to allow for portions to be rolled over onto one another in this manner. Additionally, typically in this process a vinyl seal or gasket can be placed between the edges of the lid portion and the body portion before they are rolled onto one another. This gasket material helps insure an adequate seal.

Other techniques can be used to reduce the amount of metallic material by directly connecting the edges by welding or soldering the edges together, by a process such as laser welding. This process will also provide a sealed attachment, however the temperatures necessary for this type of welding are high enough to compromise or destroy any coating placed on the inner surface of the body portion and the lid portion. This leaves an uncoated region immediately adjacent the area of the weld. Still other methods may use an intermediate material, with a lower melting point, between the lid portion and the body portion, to allow the lid portion and the body portion to be welded together, via the intermediate material, at a lower temperature.

Further, the processes discussed above, either rolling the edges of the lid portion and the body portion over onto one another, or welding the edges together require significant time to complete, thereby making the manufacture of these metallic containers more costly. The lid is generally attached to the body of the metallic container after the contents of the container have been placed therein. In the case of a carbonated beverage, as soon as a seal forms between the lid and the body of the metallic container, pressure will start to build within the container. This can cause carbonated beverage to be pushed between the lid and the body as the seal is being formed, thereby compromising the quality of the seal. Also, specifically with carbonated beverages, the portion of the beverage that leaks from within the container during the process of attachment makes a mess within the manufacturing facility.

Therefore, there is a need for an apparatus and method of forming a metallic container that will allow for a reduction in the amount of material used while providing a sealed attachment between the lid portion and the body portion without compromising any food compatible coatings placed on the inner surfaces of the lid portion and the body portion. Furthermore, there is a need for an apparatus and method of forming a metallic container that will reduce the cycle time of prior methods used to attach the lid to the body of a metallic container.

SUMMARY

In one aspect, an apparatus for attaching a lid portion to a body portion of a metallic container can include a base adapted to support the body portion of the metallic container when placed thereon, and a support assembly, movable relative to the base. The support assembly can have a support surface adapted to support an outer surface of a flange portion of the body of the metallic container. A reciprocally rotatable sonitrode can include a friction surface that can be moved linearly, generally along a longitudinal axis, relative to the support assembly between a retracted position, and an engaged position. When the lid portion is placed onto the body portion of the metallic container, and the support assembly engages the outer surface of the flange portion of the body of the metallic container, the sonitrode can be moved to the engaged position, so that confronting portions of the lid and the body of the metallic container are held in contact with one another between the support surface of the support assembly and the friction surface of the sonitrode. A motor can reciprocally rotate the sonitrode relative to the support assembly, thereby moving the lid portion of the container relative to the body portion of the container. The relative movement can be such that frictional forces generated by the reciprocal rotational motion can wipe out any coating materials on the contacting surfaces of the lid portion and body portion of the container, and can create a friction weld between the materials forming the lid and body portions of the container.

In another aspect, the motor can be adapted to reciprocally rotate the sonitrode at a rate of approximately twenty KHz, and the apparatus further includes an actuator for advancing and retracting the sonitrode between the engaged position and the retracted position. When the sonitrode is moved to the engaged position, the actuator can move the sonitrode downward in stages such that the sonitrode exerts an initial downward force to hold portions of the lid and the body of the metallic container in contact with one another between the support surface of the support assembly while the coating materials on the contacting surfaces are wiped out. The term "wiped out" is intended to connote the destruction and/or outward displacement of the coating materials on the confronting contacting surfaces or the lid portion and body portion of the container. Following the wipe out of the coating materials, the downward force can be increased to create the friction weld between the materials forming the lid and body portions of the container. The actuator can provide a downward force of up to 7200 N, but most typically, provides a downward force of approximately 2200 N.

In still another aspect, the support assembly can include a frame and a clamshell anvil. The clamshell anvil can take the form of two halves that are pivotally mounted onto opposing portions of the frame. The two halves of the pivotally mounted clamshell anvil can be pivotally moveable between an open position and a closed position and can be biased to the open position.

In yet another aspect, the sonitrode can be supported on a shaft having a cammed outer surface. Portions of the pivotally mounted clamshell anvil halves can engage the cammed outer surface, such that when the sonitrode is in the retracted position, the pivotally mounted clamshell anvil halves can engage the shaft at a point where the shaft can allow the clamshell anvil halves to pivot to the open position. When the shaft and the sonitrode begin to move downward, the cammed outer surface of the shaft can be used to force the clamshell anvil halves to pivot to the closed position so that the support surface can engage the rim portion of the body of the container. The cammed outer surface of the shaft can be shaped such that the clamshell anvil halves can be forced to pivot to the closed position prior to the sonitrode reaching the engaged position.

In still another aspect, at least one of the clamshell anvil halves can include a stop extending from an inner surface of the clamshell anvil half. The stop can be positioned vertically above the support surface, such that when the sonitrode retracts from the lid of the metallic container after welding, if the lid portion sticks to the friction surface of the sonitrode, the stop can contact the lid portion, to thereby hold the metallic container down as the sonitrode retracts upward.

In yet another aspect, the support surface of the support assembly can have a textured surface such that the support surface can frictionally engage the outer surface of the rim portion of the body of the metallic container to prevent sliding movement of the rim portion of the body relative to the support surface. The friction surface of the sonitrode can also have a textured surface such that the friction surface will frictionally engage the lid portion of the metallic container to prevent sliding movement of the lid relative to the friction surface. The textured surfaces can take a variety of forms including, without limitation, a criss-crossed knurl pattern, a diamond shaped knurl pattern, a vertically aligned knurl pattern, a raised serpentine ridge pattern, sand-blasted grit surface. Some forms of the textured surfaces can result in surprisingly enhanced performance.

In still another aspect, an interior surface of the body portion and the lid portion of the metallic container can include a protective coating. When the sonitrode is moved to the engaged position, the sonitrode can exert a downward force to hold portions of the lid and the body of the metallic container in contact with one another between the support surface of the support assembly and the friction surface of the sonitrode. The downward force of the sonitrode and the frequency of reciprocal rotation of the sonitrode can be such that the frictional heat generated from the reciprocal relative motion between the lid portion and the body portion is sufficient to create a friction weld between the lid portion and the body portion of the metallic container, and sufficiently low not to cause break-down of the coating in the areas immediately inwardly adjacent to the frictional weld.

In still another aspect, the friction surface of the sonitrode and the support surface of the support assembly can be oriented at almost any angle down to approximately five degrees to seven degrees relative to the longitudinal axis of the apparatus.

In another aspect, a method of forming a metallic container includes the steps of providing a pre-formed body portion, providing a pre-formed lid portion, placing the lid portion onto the body portion and applying a force to keep portions of the lid portion and the body portion held in contact with one another, and reciprocally rotating the lid portion with respect to the body portion, thereby generating frictional heat between the lid portion and the body portion such that a friction weld is formed therebetween.

DESCRIPTION OF THE DRAWINGS

The above, as well as other advantages of the present invention will become readily apparent to those skilled in the art from the following detailed description of a preferred embodiment when considered in the light of the accompanying drawings.

FIG. 4 is a top view of the lid portion of a metallic container.

FIG. 4A is a sectional view taken along line 4A-4A of FIG. 4.

FIG. 5 is a side sectional view of the body portion of a metallic container.

FIG. 5A is an enlarged view of a portion of FIG. 5 as indicated by the area labeled "5A" in FIG. 5.

DESCRIPTION OF THE EMBODIMENTS

Figure 1:
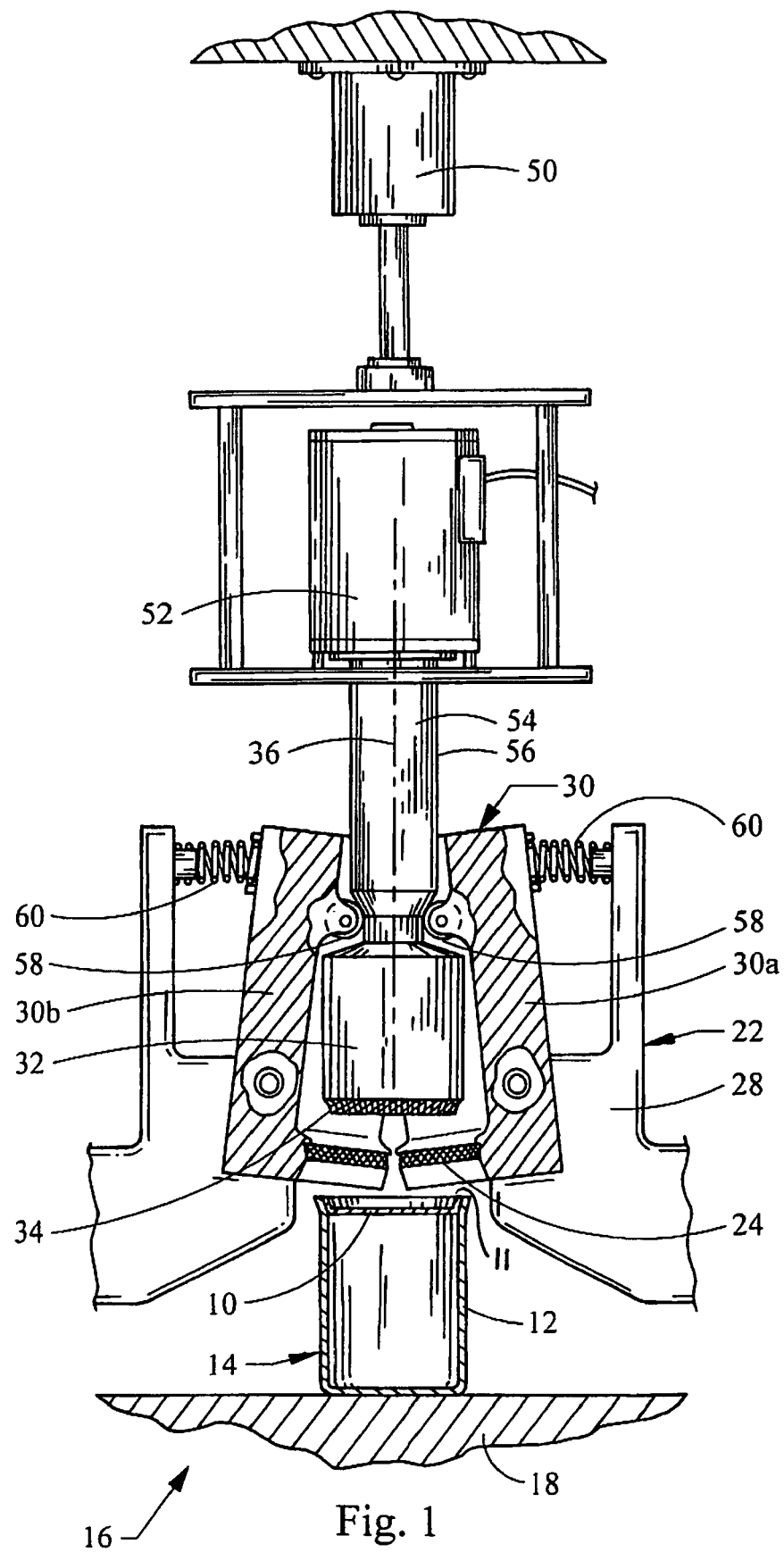
FIG. 1 is a partial sectional view of an apparatus in accordance with the present invention, wherein a sonitrode is in the fully retracted position.

Referring to FIG. 1, an apparatus for attaching a lid portion 10 to a body portion 12 of a metallic container 14 is shown generally at 16. The apparatus 16 is shown to include a base 18 that is adapted to support the body portion 12 of the metallic container 14 when placed thereon. Referring to FIGS. 5 and 5A, the body portion 12 of the metallic container 14 is generally cylindrically shaped and open at one end 11. The open end 11 includes an angled flange 20 extending circumferentially around the open end 11. A support assembly 22 is movable relative to the base 18 and is shown to include a support surface 24 adapted to support an outer surface 26 of the flange 20.

Figure 3:
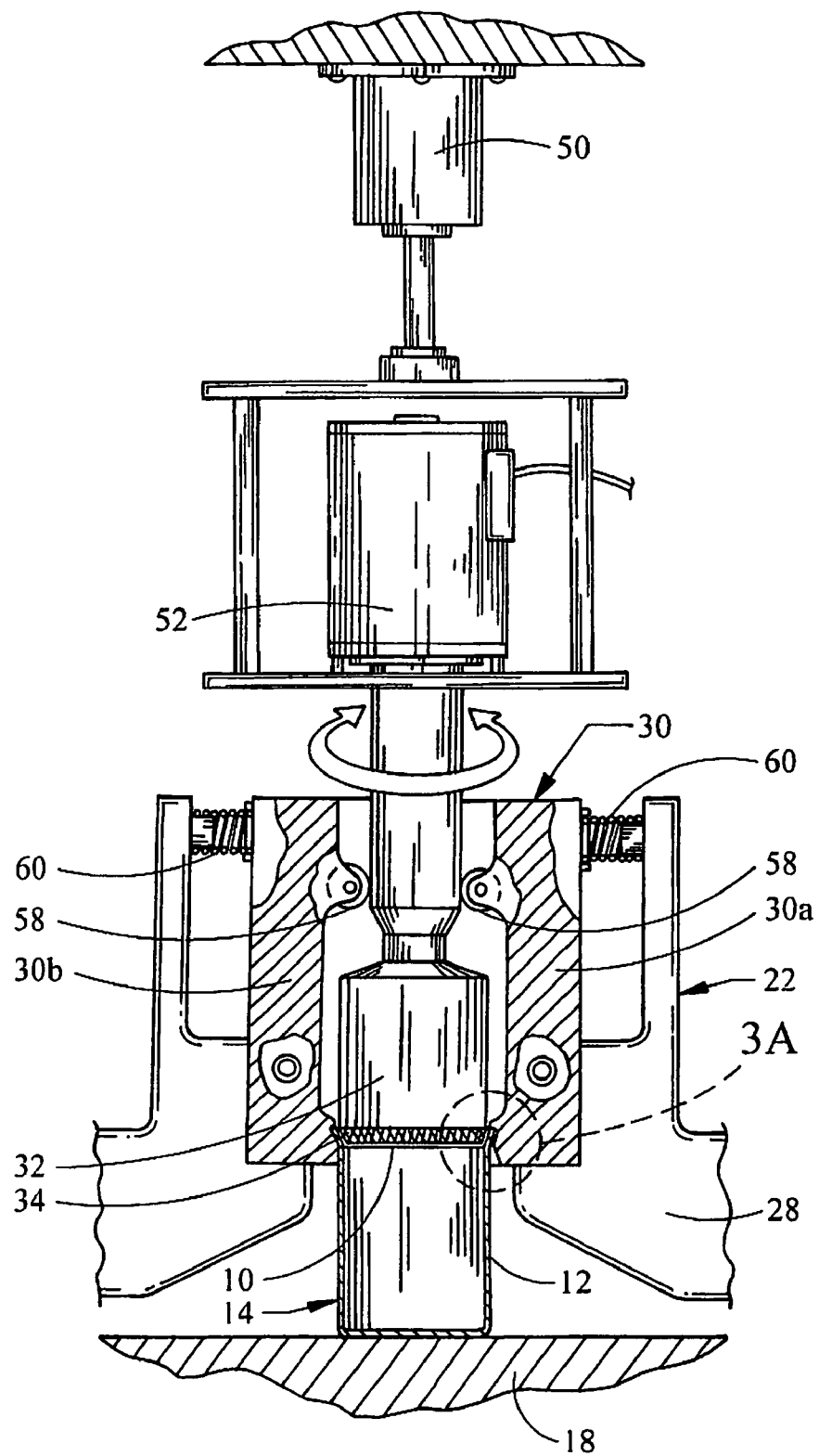
FIG. 3 is a view similar to FIG. 1, wherein the sonitrode is in the engaged position.
Figure 3A:
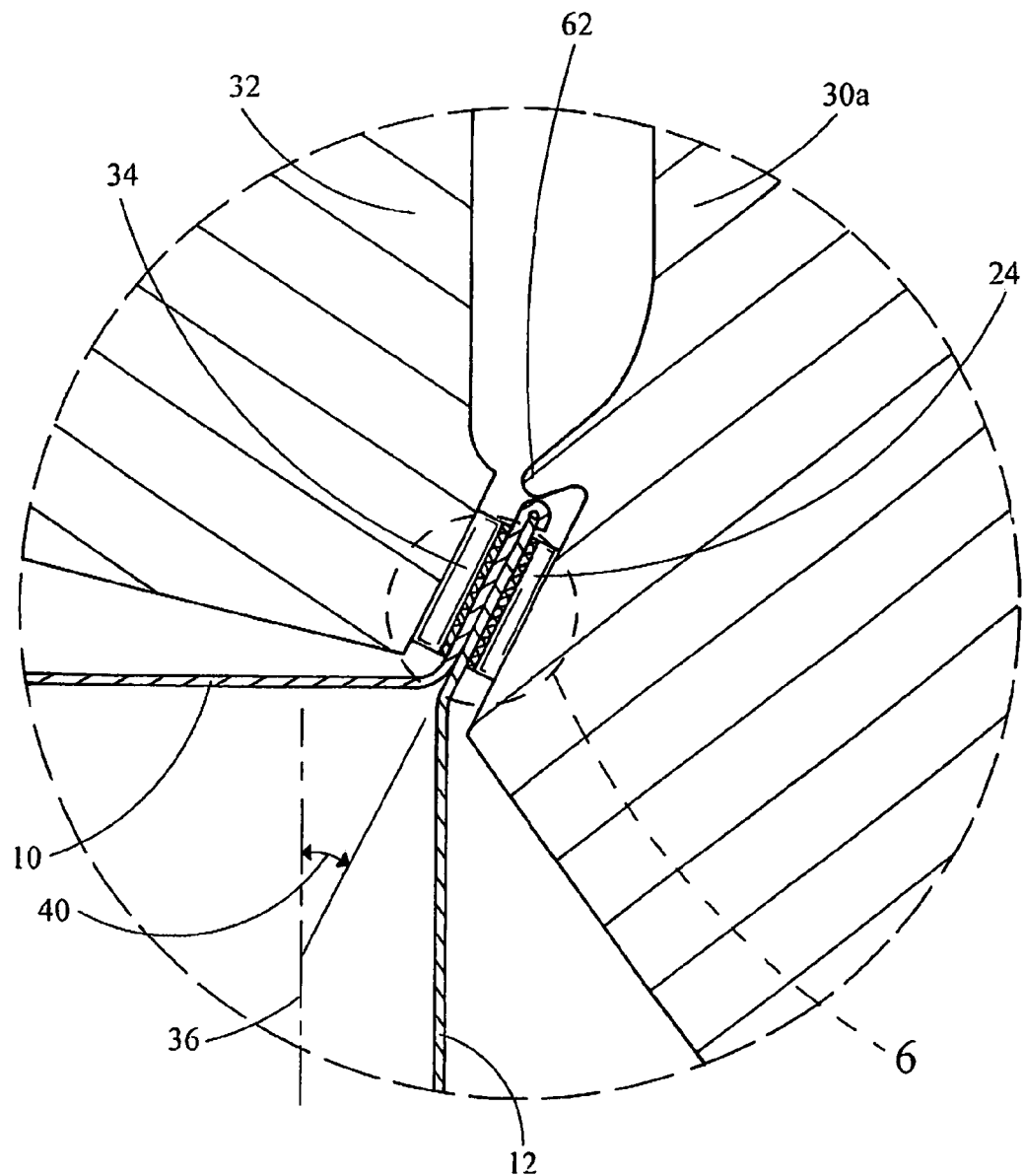
FIG. 3A is a close up view of a portion of FIG. 3 as indicated by the area labeled "3A" in FIG. 3.

The support assembly 22 includes a frame 28 and a clamshell anvil 30. The clamshell anvil 30 includes two halves 30A, 30B that are pivotally mounted onto opposing portions 28A and 28B of the frame 28. The two halves 30A and 30B of the clamshell anvil 30 pivot between an open position shown in FIG. 1 and a closed position shown in FIG. 3. Referring to FIG. 1, in the open position, the support surface 24 is pivoted away from the flange 20 of the body portion 12, thereby allowing the body portion 12 to be loaded and unloaded from the base 18. Referring to FIGS. 3 and 3A, in the closed position, the two halves of the clamshell anvil 30 are pivoted inward such that the support surface 24 contacts and supports the outer surface 26 of the flange 20 of the body portion 12.

A reciprocally rotatable and vertically moveable sonitrode 32 is mounted vertically above the base 18. The sonitrode 32 includes a friction surface 34 and is moveable linearly, along a longitudinal axis 36, relative to the support assembly 22 between a retracted position, shown in FIG. 1, and an engaged position, shown in FIG. 3. Referring to FIG. 1, in the retracted position, the sonitrode 32 is positioned vertically above the base 18 as well as the body portion 12 and lid portion 10 of the metallic container 14 situated on the base 18. Referring to FIGS. 3 and 3A, after the support assembly 22 engages the outer surface 26 of the flange 20 of the body 12 of the metallic container 14, the sonitrode 32 is moved to the engaged position, wherein the friction surface 34 of the sonitrode 32 contacts the lid portion 10 of the metallic container 14.

Referring to FIGS. 4 and 4A, the lid portion 10 of the metallic container 14 is generally disk shaped and includes an angled flange 38 extending circumferentially around the disk perimeter. The angle 40 of the flange 20 on the body portion 12 is approximately equal to the angle 40 of the flange 38 on the lid portion 10 of the metallic container 14, such that when the lid portion 10 is placed onto the body portion 12, an inner surface 42 of the flange 38 on the lid portion 10 contacts a confronting inner surface 44 of the flange 20 on the body portion 12. The flange 38 on the lid portion 10 includes a curled lip 46 which curls outward such that when the lid portion 10 is placed onto the body portion 12, the curled lip 46 engages the distal end of the flange 20 on the body portion 12. The angled flanges 20 and 38 on the lid and the body portions 10 and 12, and the curled lip 46 of the flange 38 on the lid portion 10, make loading the lid portion 10 to the body portion 12 quick and simple. Furthermore, the lid portion 10 and the body portion 12 are self-centering with one another so that additional tooling is not necessary to keep the components 10 and 12 centered during the welding process.

When the sonitrode 32 is moved to the engaged position, the friction surface 34 contacts an outer surface 48 of the flange 38 on the lid portion 10. When the sonitrode 32 is in the engaged position, the flange 38 on the lid portion 10 and the flange 20 on the body portion 12 are held in contact with one another between the support surface 24 of the support assembly 22 and the friction surface 34 of the sonitrode 32, as best shown in FIG. 3A.

An actuator 50 moves the sonitrode 32 between the engaged position and the retracted position. The actuator 50 pushes the sonitrode 32 downward such that when the sonitrode 32 is moved to the engaged position, the sonitrode 32 exerts a downward force to hold the flanges 20 and 38 of the lid and the body portions 10 and 12 of the metallic container 14 in contact with one another between the support surface 24 of the support assembly 22 and the friction surface 34 of the sonitrode 32. When the sonitrode 32 is moved to the engaged position, the actuator 50 can move the sonitrode 32 downward in stages such that the sonitrode 32 exerts an initial downward force to hold flange 20 and 38 of the lid 10 and the body 12 of the metallic container 14 in contact with one another between the support surface 24 of the support assembly 22 and the friction surface 34 of the sonitrode 32, while the coating materials on the contacting surfaces 42 and 44 are wiped out. Following the wipe out of the coating materials, the downward force can be increased to create the friction weld between the materials forming the lid portion 10 and the body portion 12 of the container 14. The actuator 50 is adapted to provide a downward force between approximately 1300 N and approximately 7200 N. Preferably, the downward force applied during the welding of the surfaces 42 and 44 is approximately 2200 N.

A motor 52 is adapted to reciprocally rotate the sonitrode 32 relative to the support assembly 22. Reciprocal movement of the sonitrode 32 relative to the support assembly 22 moves the lid portion 10 relative to the body portion 12. The motor 52 is adapted to reciprocally rotate the sonitrode 32 at a rate of between 15 KHz and 25 KHz. Preferably, the sonitrode 32 is reciprocally rotated at a frequency of approximately 20 KHz. This reciprocal movement can creates frictional wear necessary to wipe out any protective coating on the surfaces 42 and 44, and can create the heat between the flanges 20, 38 of the lid portion 10 and the body portion 12, such that a friction weld is formed between the flanges 20, 38 of the lid portion 10 and the body portion 12 of the metallic container 14.

Preferably, the sonitrode 32 is made from powered metal, and may be tuned using sound waves to control the amplitude of the reciprocal rotation at the point of contact between the friction surface 34 and the flange 38 of the lid portion 10. The amplitude of the reciprocal rotation can be important and is dependant upon several factors, including, but not limited to, the diameter at the point of contact between the flange 38 of the lid portion 10 and the friction surface 34 of the sonitrode 32, the magnitude of the downward force on the sonitrode 32, the thickness of the flanges 20, 38 of the lid portion 10 and the body portion 12, etc. For example, the amplitude of reciprocal rotation for a typical carbonated beverage can would be on the scale of approximately $5\times10^{-3}$ cm or about $0.1°$ of arc.

Figure 2:
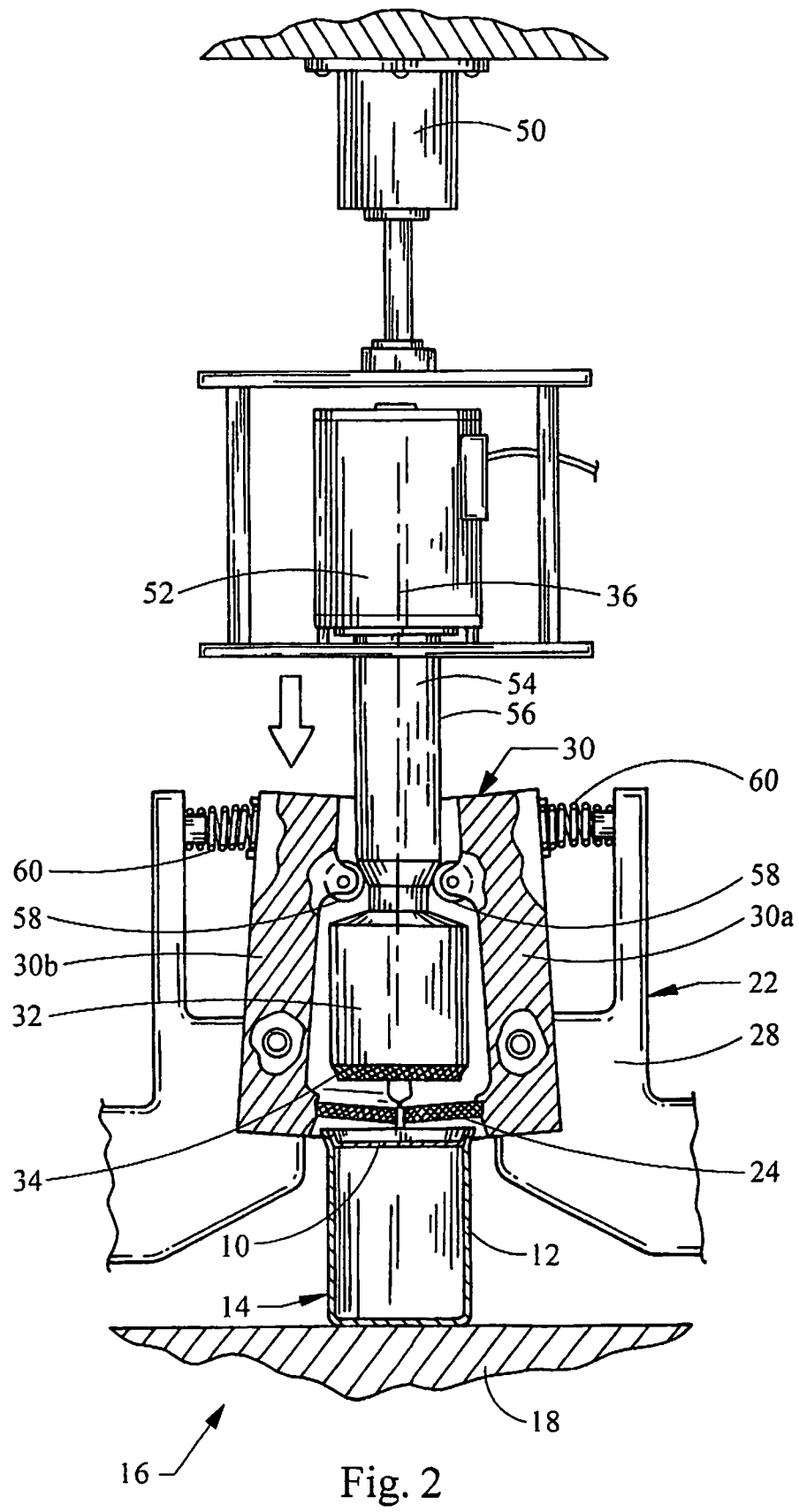
FIG. 2 is a view similar to FIG. 1, wherein the sonitrode is moving downward toward the engaged position.

The sonitrode 32 is supported on a shaft 54 extending between the motor 52 and the sonitrode 32. The shaft 54 has a cammed outer surface 56. Portions of the pivotally mounted clamshell anvil halves 30A, 30B engage the cammed outer surface 56. Referring to FIGS. 1-3, each half 30A, 30B of the clamshell anvil 30 includes a rolling contact 58. The support assembly 22 includes springs 60 that bias the halves 30A, 30B of the clamshell anvil 30 away from the closed position and keeps the rolling contacts 58 held against the cammed outer surface 56 of the shaft 54. When the sonitrode 32 is in the retracted position, the rolling contacts 58 engage the shaft 54 at a narrow point in the shaft 54, wherein the rolling contacts 58 can move inward and the springs 60 bias the halves 30A, 30B of the clamshell anvil 30 to the open position, as shown in FIG. 1.

As the sonitrode 32 begins to move downward, as shown in FIG. 2, the rolling contacts 58 follow the cammed outer surface 56 of the shaft 54 and are pushed outward against the biasing springs 60 of the support assembly 22. As the sonitrode 32 moves downward, the rolling contacts 58 are contacting portions of the shaft 54 that are gradually increasing in diameter, such that the rolling contacts 58 are pushed outward, the halves 30A, 30B of the clamshell anvil 30 are pivoted against the biasing springs 60 and begin to pivot to the closed position.

Finally, as the sonitrode 32 and the shaft 54 continue to move downward, the rolling contacts 58 reach a point on the shaft 54 where the diameter of the shaft 54 pushes the rolling contacts 58 outward to a point where the halves 30A, 30B of the clamshell anvil 30 are pivoted to the closed position, as shown in FIG. 3. The rolling contacts 58 reach the point on the shaft 54 where the diameter of the shaft 54 pushes the rolling contacts 58 outward such that the halves 30A, 30B of the clamshell anvil 30 are pivoted to the closed position before the sonitrode 32 contacts the lid portion 10 of the metallic container 14. Specifically, the two halves 30A, 30B of the clamshell anvil 30 reach the closed position and the support surface 24 contacts the outer surface 26 of the flange 20 on the body portion 12 of the metallic container 14 prior to the friction surface 34 of the sonitrode 32 contacting the flange 38 on the lid portion 10 of the metallic container 14, thus resulting in some lost motion.

This lost motion allows the sonitrode 32 to retract from the lid portion 10 prior to the halves 30A, 30B of the clamshell anvil 30 opening. Referring to FIG. 3A, at least one of the clamshell anvil halves 30A, 30B includes a stop 62 extending from an inner surface 64 of the clamshell anvil half 30A, 30B. The stop 62 is positioned vertically above the support surface 24, such that when the sonitrode 32 retracts from the lid portion 10 of the metallic container 14 after welding, if the lid portion 10 of the metallic container 14 sticks to the friction surface 34 of the sonitrode 32, the stop 62 will contact the lid portion 10, thereby holding the metallic container 14 down as the sonitrode 32 retracts upward.

If the halves 30A, 30B of the clamshell anvil 30 open immediately upon motion of the sonitrode 32, then the halves 30A, 30B of the clamshell anvil 30 would pivot away from the metallic container 14, and the metallic container 14 could become stuck to the friction surface 34 of the sonitrode 32, requiring manual removal by an operator of the apparatus 16.

Figure 10:
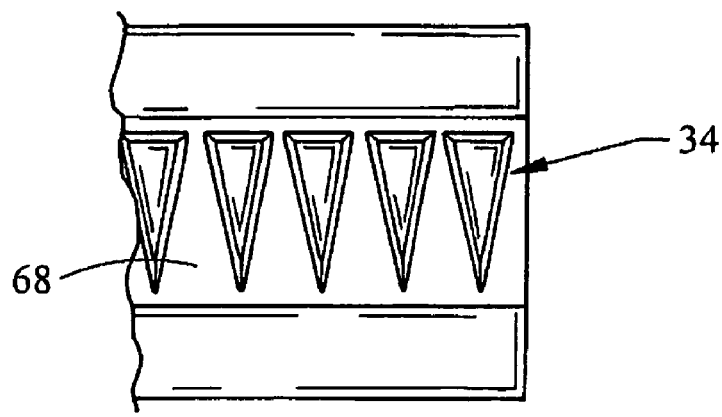
FIG. 10 is a perspective view similar to FIG. 10 wherein the friction surface has a diamond shaped knurl pattern formed thereon.
Figure 11:
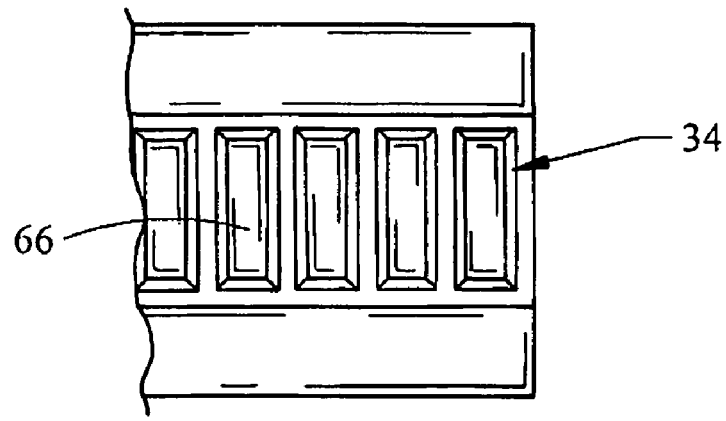
FIG. 11 is a perspective view of a portion of the friction surface on the sonitrode wherein the friction surface has a vertically aligned knurl pattern formed thereon.

The risk of the lid portion 10 sticking to the friction surface 34 of the sonitrode 32 is a real concern, because in order for the friction surface 34 of the sonitrode 32 to grip the flange 38 on the lid portion 10, the friction surface 34 of the sonitrode 32 is rough. In one embodiment, the friction surface 34 of the sonitrode 32 has a knurled pattern formed therein. In order to assist in the removal of the sonitrode 32 from the lid portion 10 after welding, the knurled surface of the friction surface 34 can have a vertically oriented knurl 66 formed therein, such as that shown in FIG. 11. Alternatively, a downward pointing triangular shaped knurl pattern 68, such as the one shown in FIG. 10, can be used. These knurl patterns 66, 68, would more readily allow the friction surface 34 of the sonitrode 32 to retract from the lid portion 10 with a reduced chance of the lid portion 10 sticking to the friction surface 34.

Figure 9:
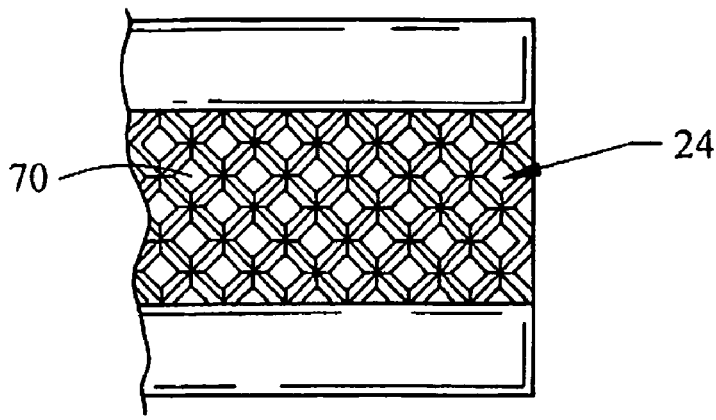
FIG. 9 is a perspective view of a portion of the support surface wherein the support surface has a criss-crossed knurl pattern formed thereon.

Likewise, the support surface 24 of the support assembly 22 also has a rough surface. This rough surface allows the support surface 24 to grip the outer surface 26 of the flange 20 on the body portion 12 to prevent sliding movement of the flange 20 of the body portion 12 relative to the support surface 24. As the support surface 24 retracts radially from the outer surface 26 of the body portion 12, the risk of the body portion 12 sticking to the support surface 24 is not as important as with the sonitrode 32 and the lid portion 10, therefore a conventional criss-cross knurl pattern 70 can be used, such as that shown in FIG. 9.

The depth of the knurl patterns 66, 68, 70 on the friction surface 34 of the sonitrode 32 and the support surface 24 of the support assembly 22 is calibrated according to the thickness of the flanges 20, 38 of the lid portion 10 and the body portion 12 and the downward pressure of the sonitrode 32. If the depth of the knurl pattern 66, 68, 70 is too deep, the downward pressure could push the knurl substantially or completely through the flanges 20, 38 of the lid portion 10 and the body portion 12. Therefore, the thickness of the knurl is carefully calibrated to allow the knurl pattern to press into the flanges 20, 38 of the lid portion 10 and the body portion 12 sufficiently enough to engage and frictionally grip the flanges 20, 38, without sinking deep enough into the thickness of the flanges 20, 38 to compromise the structural integrity of the weld. Typically the depth of the knurl pattern 66, 68, 70 is calibrated as a percentage of the thickness of the flanges 20, 38 of the lid portion 10 and the body portion 12.

Figure 12:
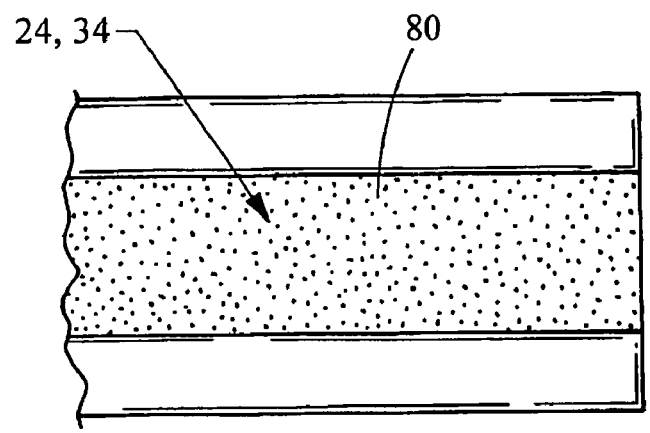
FIG. 12 is a perspective view of a portion of one of the friction surface and the support surface, wherein the surface has been grit blasted.
Figure 13:
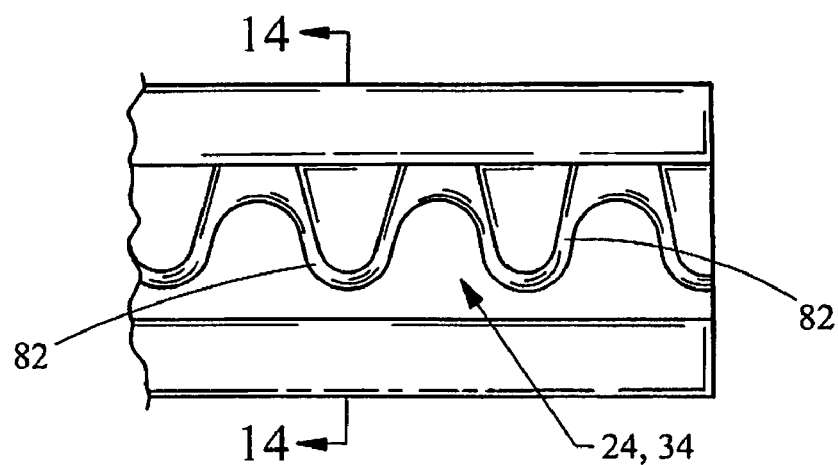
FIG. 13 is a perspective view of a portion of one of the friction surface and the support surface, wherein the surface includes a raised serpentine ridge extending thereabout.
Figure 14:
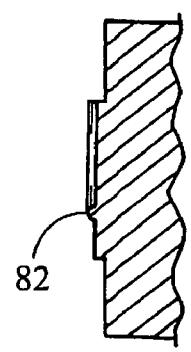
FIG. 14 is a sectional view taken along lines 14-14 of FIG. 13.

In another embodiment, the support surface 24 of the support assembly 22 and the friction surface 34 of the sonitrode 32 have a textured surface rather than a knurled surface. Referring to FIG. 12, the support surface 24 of the support assembly 22 and the friction surface 34 of the sonitrode 32 can be sand-blasted or grit-blasted, thereby creating a textured surface 80. In still another embodiment, the support surface 24 of the support assembly 22 and the friction surface 34 of the sonitrode 32 can each include a raised ridge 82 extending thereabout. Referring to FIGS. 13 and 14, the raised ridge 82 extends around the support surface 24 and the friction surface 34 in a serpentine manner. When the friction surface 34 of the sonitrode 32 contacts the lid portion 10 and the flanges 20, 38 of the lid portion 10 and the body portion 12 are held between the friction surface 34 and the support surface 24, the raised ridges 82 on the friction surface 34 and support surface 24 will create pressure points against the flanges 20, 38. Other embodiments can be envisioned wherein the support surface 24 of the support assembly 22 and the friction surface 34 of the sonitrode 32 each include a raised ridge 82 extending thereabout in a serpentine manner, and include portions that are grit blasted or sand blasted to increase the frictional grip of those portions.

Preferably, the interior surfaces 42, 44 of the lid portion 10 and the body portion 12 are coated with a food compatible coating 72 prior to being assembled. These coatings 72 are typically organic coatings. A variety of coatings can be used on the interior surfaces of the lid portion and the body portion of the container, which are preferably satisfactory for food contact, to prevent corrosion of the inner surface of the metallic food container and to prevent the metal from contaminating the taste of the food placed therein. The coating can be any of the materials identified, for example, in U.S. Pat. No. 5,739,215, which are hereby incorporated by reference. Typically, the body portion and the lid portion have the inner surfaces coated prior to the lid portion being attached to the body portion. It is important that any process used to attach the lid portion 10 to the body portion 12 does not compromise the integrity of any coatings 72 placed thereon.

The downward force that the sonitrode 32 places on the lid portion 10 presses the flange 38 of the lid portion 10 and the flange 20 of the body portion 12 together. That downward force and the frequency of the reciprocal movement of the sonitrode 32 are carefully calibrated such that the frictional heat generated from the reciprocal relative motion between the lid portion 10 and the body portion 12 is sufficient to initially wipe out the coating between the lid portion 10 and the body portion 12 of the metallic container 14. There after, the downward force of the sonitrode 32 can be increased such that the frictional heat generated from the reciprocal relative motion between the lid portion 10 and the body portion 12 is create a friction weld between the lid portion 10 and the body portion 12 of the metallic container 14, while being sufficiently low enough to prevent break-down of the coating 72 inwardly adjacent to the weld area.

Figure 6:
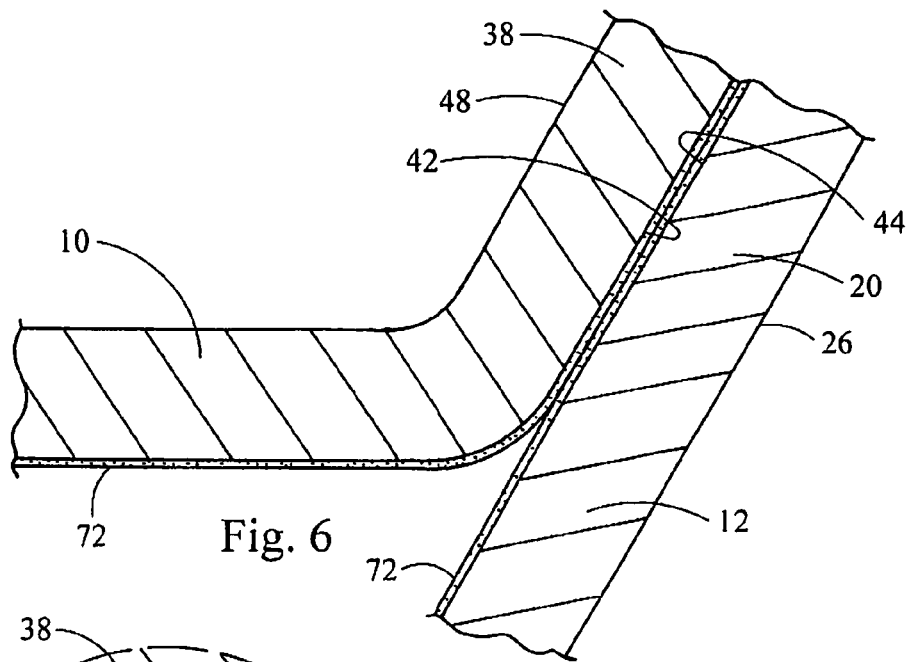
FIG. 6 is an enlarged view of a portion of FIG. 3A as indicated by the area labeled "FIG. 6" in FIG. 3A, prior to friction welding.

This allows the formation of a weld zone 74 between the inner surfaces 42, 44 of the flanges 20, 38 of the lid portion 10 and the body portion 12 while maintaining the integrity of the coating 72 on these surfaces 42, 44. Referring to FIG. 6, a close up view shows the flange 38 of the lid portion 10 and the flange 20 of the body portion 12 prior to welding. The inner surface 42 of the flange 38 on the lid portion 10 has a coating 72 placed thereon and the inner surface 44 of the flange 20 on the body portion 12 has a coating 72 placed thereon. The coatings 72, as well as protecting the contents of the metallic container 14, after the lid portion 10 is attached to the body portion 12, also assist in the friction welding.

Thermoplastic coatings 72 can provide lubrication between the lid portion 10 and the body portion 12 to more easily allow relative motion between the two as the sonitrode 32 begins to move back and forth. As the frictional heat increases, the thermoplastic coatings 72 can become more fluid, thereby acting as a lubricant. After a short time, the heat begins to build up, and the downward pressure of the sonitrode 32 pushes the heated coating 72 away from the area directly between the friction surface 34 of the sonitrode 32 and the support surface 24 of the support assembly 22, or specifically, the weld zone 74. In the embodiment including raised serpentine ridges 82 on the friction surface 34 and the support surface 24, the pressure points created by the raised ridges 82 will push against the outer surfaces 26, 48 of the flanges 20, 38 thereby defining flow paths between the inner surfaces 42, 44 of the flanges 20, 38. The liquefied coating material 72 will flow, via the flow paths, outward, away from the weld zone 74. In this way, the raised serpentine ridges 82 assist in removing the coating material 72 from between the flanges 20, 38, thereby helping to insure a contaminant free weld zone 74. Coatings 72 formed of thermoset resins are observed to quickly become powdered and expelled outward from the weld zone 74.

Figure 8:
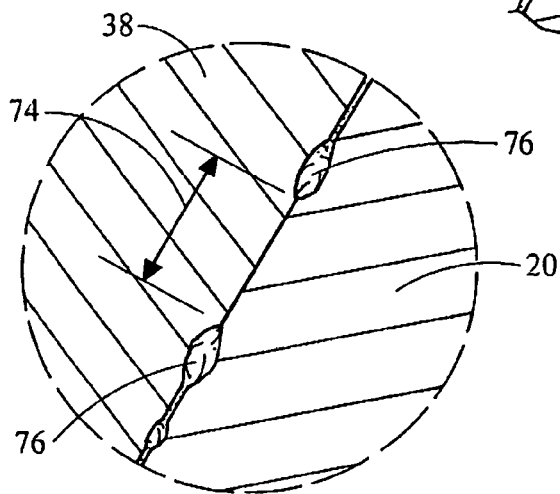
FIG. 8 is an enlarged portion of FIG. 7 as indicated by the area labeled "8" in FIG. 7.
Figure 7:
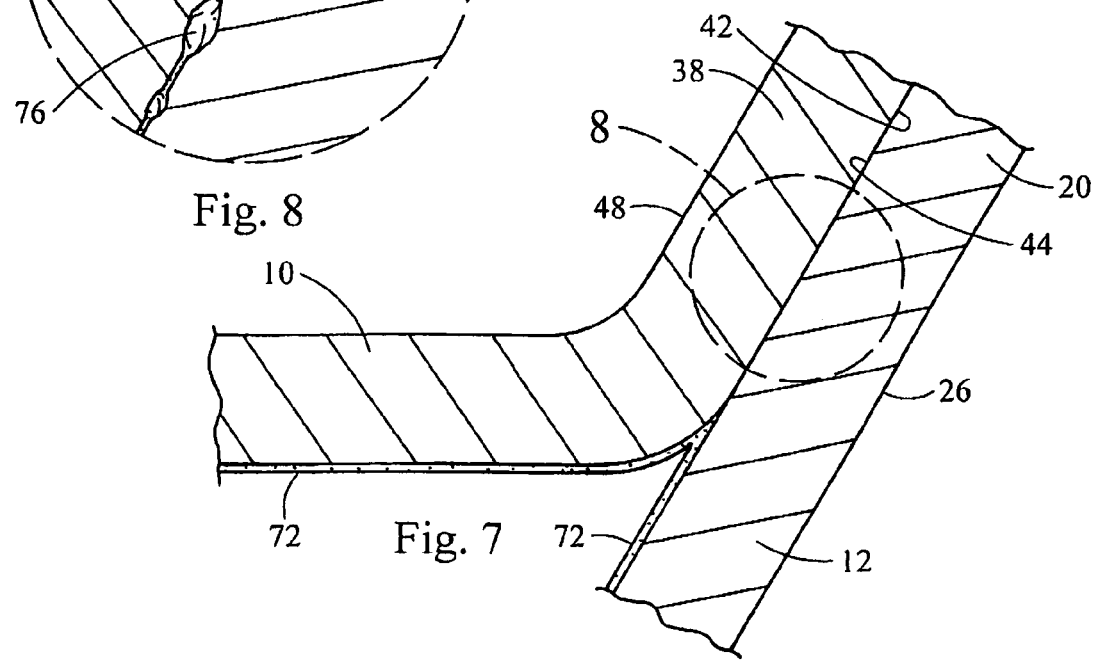
FIG. 7 is a view similar to FIG. 6, shown after friction welding.

Referring to FIGS. 7 and 8, once the coatings 72 are wiped out from the weld zone 74, the flange 38 of the lid portion 10 and the flange 20 of the body portion 12 are in direct contact within the weld zone 74. As reciprocal motion continues, the heat eventually builds up and forms a friction weld between the lid portion 10 and the body portion 12 within this weld zone 74. Referring specifically to FIG. 8, the weld zone 74 is the area wherein the lid portion 10 and the body portion 12 are actually welded to one another. The coating material 72 that was wiped out of the weld zone 74 can form pockets 76 of coating material 72 immediately adjacent each side of the weld zone 74. These pockets 76 of coating material 72 helps insure that there are no gaps in the coating material 72 at the point of welding.

Referring again to FIG. 3A, the friction surface 34 of the sonitrode 32 and the support surface 24 of the support assembly 22 are oriented at an angle 40 relative to the longitudinal axis 36 of the apparatus, along which the sonitrode 32 moves. Preferably, the friction surface 34 of the sonitrode 32 and the support surface 24 of the support assembly 22 are inwardly angled. The flanges 20, 38 on the lid portion 10 and the body portion 12 are correspondingly angled, as discussed previously. The angled orientation means that the downward force of the sonitrode 32 will provide a force to directly keep the flange 38 of the lid portion 10 and the flange 20 of the body portion 12 held together. This force will also act to push downward on the lid portion 10 relative to the body portion 12. This means that as the weld zone 74 is forming, the downward force pushing on the lid portion 10 will cause the weld zone 74 to smear radially inward. This increases the size of the weld zone 74 and the depth of the weld between the lid portion 10 and the body portion 12.

The method of forming a metallic container 14 generally includes the steps of providing a pre-formed body portion 12, providing a pre-formed lid portion 10, placing the lid portion 10 onto the body portion 12 and applying a force to keep portions of the lid portion 10 and the body portion 12 held in contact with one another, and reciprocally rotating the lid portion 10 with respect to the body portion 12, thereby generating frictional heat between the lid portion 10 and the body portion 12 such that a friction weld is formed therebetween.

Referring to FIGS. 4, 4A, 5, and 5A, preferably, the body portion 12 is generally cylindrically shaped and is open at one end, the open end having an angled flange 20 extending circumferentially around the open end. A coating 72 is placed on the inner surface 44 of the body portion 12. The lid portion 10 is generally disk shaped and includes an angled flange 38 extending circumferentially around the disk perimeter. The angle 40 of the flange 20 on the body portion 12 being approximately equal to the angle 40 of the flange 38 on the lid portion 10. The lid portion 10 has a coating 72 placed on the inner surface 42 as well.

Preferably, the lid portion 10 and the body portion 12 are cold formed from a metallic material such as aluminum. It is to be understood that the metallic container 14 can be made from any suitable metallic material, and aluminum is being described here as one example of such a metallic material. The lid portion 10 is coated prior to the lid portion 10 being cold formed into pre-formed shape, and the body portion 12 is coated after being cold formed into the pre-formed shape.

The lid portion 10 and the body portion 12 are be placed together such that the inner surface 42 of the flange 38 of the lid portion 10 contacts the inner surface 44 of the flange 20 on the body portion 12. The force applied to keep the inner surface 42 of the flange 38 on the lid portion 10 held in contact with the inner surface 44 of the flange 20 on the body portion 12 should be between approximately 1800 N and approximately 2700 N. Preferably, the force is approximately 2250 N.

The lid portion 10 is be rotated reciprocally relative to the body portion 12 at a rate between 15 KHz and 25 KHz. Preferably, the lid portion 10 is reciprocally rotated at a frequency of approximately 20 KHz.

Preferably all steps are performed by providing an apparatus 16 such as that described above. The body portion 12 of the metallic container 14, generally filled with suitable contents such as a food or beverage, is placed onto the base 18 of the apparatus 16. The lid portion 10 of the metallic container 14 is then placed onto the body portion 12 of the metallic container 14.

The actuator 50 is activated and begins to move the sonitrode 32 downward toward the metallic container 14. As the sonitrode 32 and the shaft 54 on which the sonitrode 32 is mounted, begin to move downward, the rolling contacts 58 on the two halves 30A, 30B of the clamshell anvil 30 follow the cammed outer surface 56 of the shaft 54, thereby pushing the rolling contacts 58 outward and causing the two halves 30A, 30B of the clamshell anvil 30 to pivot against the biasing springs 60 mounted onto the support assembly 22.

When the rolling contacts 58 reach a point on the cammed outer surface 56 of the shaft 54 wherein the two halves 30A, 30B of the clamshell anvil 30 are pivoted to the closed position, the support surface 24 of the clamshell anvil 30 contacts the outer surface 26 of the flange 20 on the body portion 12 of the metallic container 14. The sonitrode 32 continues to move downward to the engaged position, wherein the friction surface 34 of the sonitrode 32 contacts the flange 38 on the lid portion 10 of the metallic container 14.

The actuator 50 pushes the sonitrode 32 downward with a force of approximately 2250 N. After the sonitrode 32 reaches the engaged position, and the friction surface 34 of the sonitrode 32 is in contact with the flange 38 of the lid portion 10 and the support surface 24 of the support assembly 22 is in contact with the flange 20 of the body portion 12, the motor 52 begins to reciprocally rotate the sonitrode 32. The sonitrode 32 reciprocally rotates relative to the support assembly 22, thereby reciprocally rotating the lid portion 10 relative to the body portion 12 of the metallic container 14. The motor 52 reciprocally rotates the sonitrode 32 at a frequency of approximately 20 KHz, thereby generating sufficient frictional heat to wipe out the coating 72 on the inner surfaces 42, 44 of the body portion 12 and the lid portion 10 to the sides of the weld zone 74 and forming a friction weld between the flanges 20, 38 of the lid portion 10 and the body portion 12 within the weld zone.

Alternatively, the actuator 50 moves the sonitrode 32 to the engaged position, and pushes the sonitrode 32 downward with a first downward force. The motor 52 is activated, and the sonitrode 32 is reciprocally rotated at a first frequency for a first predetermined amount of time. Specifically, the sonitrode 32 exerts sufficient force (first downward force) and the motor 52 reciprocally rotates the sonitrode 32 at a frequency (first frequency) until any thermoplastic coating material 72 placed on the inner surfaces 42, 44 of the flanges 20, 38 is allowed to melt, and become liquid. The first downward force and the first frequency are sufficient to create frictional heat to melt the coating material 72, however not sufficient to create enough frictional heat to form a weld. This melted coating material 72 acts as a lubricant to allow continued movement between the flanges 20, 38.

However, the coating materials 72 could compromise the integrity of the weld formed between the flanges 20, 38, so the downward force and the frequency of rotation are held at the first downward force and the first frequency until the melted thermoplastic coating material 72 has migrated away from the weld zone 74. It is possible, to use the frictions surface 34 and support surface 24 illustrated in FIGS. 13 and 14 to assist in this migration.

The support surface 24 and the friction surface 34 each have a raised ridge 82 extending therearound in a serpentine pattern such that when the friction surface 34 of the sonitrode 32 contacts the lid portion 10 and the flanges 20, 38 of the lid portion 10 and the body portion 12 are held between the friction surface 34 and the support surface 24, the raised ridges 82 on the friction surface 34 and support surface 24 will create pressure points against the flanges 20, 38. The first downward pressure is adapted to apply sufficient pressure, such that the raised serpentine ridges 82 on the friction surface 34 and the support surface 24 create pressure points against the outer surfaces 26, 48 of the flanges 20, 38, thereby defining flow paths between the inner surfaces 42, 44 of the flanges 20, 38. The flow paths will allow the melted thermoplastic coating material 72 to more readily flow from within the weld zone 74, and the reciprocal rotation of the sonitrode 32 will help push the melted thermoplastic coating material 72 through these flow passages. Similar flow patterns are observed for powdered non-thermoplastic coatings.

Typically, when applied to a typical carbonated beverage can, it takes approximately two to six hundredths of a second to wipe out the coatings 72 from the weld zone 74. Once the coating material has been wiped out, the downward pressure of the sonitrode 32 is increased to a second downward force and the frequency of reciprocal rotation of the sonitrode 32 is increased to second frequency. The downward pressure and the frequency are increased to levels appropriate to create sufficient heat and pressure to form a friction weld between the flanges 20, 38, and held at those levels until the friction weld is formed. When applied to a typical carbonated beverage can, this portion of the process takes approximately one to two tenths of a second.

Preferably, the first downward force and the first frequency are between approximately sixty percent and approximately seventy percent of the second downward force and the second frequency. As previously discussed, the downward force and the frequency are application dependant. The downward force and the frequency of reciprocal rotation, depend on the thickness of the flanges 20, 38, the material that is being welded, the diameter of the sonitrode 32, and other factors. For example, in a particular application, the downward pressure and frequency of reciprocal rotation necessary to create a friction weld between the flanges 20, 38 of the lid portion 10 and the body portion 12 are 2250 N and 20 KHz, respectively. These are the second downward force and the second frequency. The first downward force and the first frequency would be sixty to seventy percent of the second downward force and second frequency, or between 1350 N and 2200 N and between 12 and 14 KHz, respectively.

The method and apparatus 16 described above provide a technique of attaching the lid portion 10 to the body portion 12 of a metallic container 14 that creates a solid metal seal between the lid portion 10 and the body portion 12, while maintaining the integrity of any coatings 72 placed on the inner surfaces 42, 44 of either component. The process is quicker than any known prior processes, and eliminates additional material necessary for rolling the edges of the lid portion 10 and the body portion 12 onto one another. Furthermore, no intermediate material is necessary between the flanges 20, 38 of the lid portion 10 and the body portion 12. The method and apparatus 16 described herein create a weld directly between the flanges 20, 38 of the lid portion 10 and the body portion 12 with no intermediate material or gaskets of any kind necessary. The temperatures of the process described above remain relatively low compared to prior art processes, thereby making it possible to maintain a food suitable coating 72 the inner surfaces 42, 44 of the components.

In accordance with the provisions of the patent statutes, the present invention has been described in what is considered to represent its preferred embodiment. However, it should be noted that the invention can be practiced otherwise than as specifically illustrated and described.

What is claimed is:

1. A method of forming a metallic container comprising:
   providing a pre-formed body portion;
   providing a pre-formed lid portion;
   supporting the pre-formed body portion on a support assembly
   placing the lid portion onto the body portion into an initial engagement with one another with a sonitrode that is movable with respect to the support assembly, and applying a first downward force to keep portions of the lid portion and the body portion held in contact with one another;

reciprocally rotating the lid portion with respect to the body portion with the sonitrode at a first frequency for a predetermined amount of time, increasing the downward force to a second downward force, larger than the first downward force, and increasing the rate of reciprocal rotation of the sonitrode to a second frequency, larger than the first frequency, after the predetermined amount of time has passed; and holding the sonitrode in the engaged position, at the second downward force, and maintaining the reciprocal rotation of the sonitrode, at the second frequency for a second predetermined amount of time, thereby generating frictional heat between the lid portion and the body portion such that a friction weld is formed therebetween.

2. The method of claim 1, further comprising the steps of providing the pre-formed body portion with a generally cylindrically shape open at one end, the open end having an angled flange extending circumferentially therearound, providing the pre-formed lid portion with a generally disk shape including an angled flange extending circumferentially therearound, the angle of the flange on the body portion being approximately equal to the angle of the flange on the lid portion.

3. The method of claim 2, wherein said step of placing the lid portion onto the body portion and applying a force to keep portions of the lid portion and the body portion held in contact with one another includes placing the lid portion onto the body portion such that an inner surface of the flange of the lid portion contacts an inner surface of the flange on the body portion and applying the first downward force to keep the inner surface of the flange on the lid portion held in contact with the inner surface of the flange on the body portion.

4. The method of claim 3, wherein said step of applying the first downward force to keep the inner surface of the flange on the lid portion held in contact with the inner surface of the flange on the body portion includes applying a force of between approximately 1800 N and 2700 N.

5. The method of claim 1, wherein said step of reciprocally rotating the lid portion with respect to the body portion at the first or second frequency includes reciprocally rotating the lid portion with respect to the body portion at a rate between 15 KHz and 25 KHz.

6. The method of claim 1, wherein said step of placing the lid portion onto the body portion into an initial engagement is with a force of approximately 2250 N.

7. The method of claim 1, wherein said step of reciprocally rotating the lid portion with respect to the body portion comprises the step of activating a motor coupled to the sonitrode such that the motor reciprocally rotates the sonitrode at a frequency of approximately 25 KHz relative to the support assembly.

8. The method of claim 1, wherein the step placing the lid portion onto the body portion into an initial engagement with one another with a sonitrode, applying a first downward force to keep portions of the lid portion and the body portion held in contact with one another, and reciprocally rotating the lid portion with respect to the body portion with the sonitrode at a first frequency for a predetermined amount of time includes the step of:

wiping out any coating material on confronting surfaces of the body portion and lid portion to expose a weld zone.

9. The method of claim 8, wherein said steps of increasing the downward force to a second downward force, larger than the first downward force, and increasing the rate of reciprocal rotation of the sonitrode to a second frequency, larger than the first frequency, after the predetermined amount of time has passed; includes the step of:

maintaining the reciprocal rotation of the sonitrode at the second frequency until a friction weld has been formed in the weld zone.

10. The method of claim 1, wherein the first frequency and the first downward force are between approximately sixty percent and approximately seventy percent of the second frequency and the second downward force, respectively.

11. The method of claim 1, wherein the second downward force applied is between approximately 1800 N and 2700 N.

12. The method of claim 11, wherein the second downward force applied is between approximately 2200 N and 2250 N.

13. The method of claim 1, wherein the first downward force applied is between approximately sixty percent and approximately seventy percent of the second downward force.

14. The method of claim 1, wherein the second frequency of reciprocal rotation is between approximately 15 KHz and 25 KHz.

15. The method of claim 14, wherein the second frequency of reciprocal rotation is approximately 20 KHz.

16. The method of claim 1, wherein the first frequency of reciprocal rotation is between approximately sixty percent and approximately seventy percent of the second frequency.

17. The method of claim 1, further comprising the step of providing the pre-formed body portion with a generally cylindrically shape open at one end, the open end having an angled flange extending circumferentially therearound.

18. The method of claim 1, further comprising the step of providing the pre-formed lid portion with a generally disk shape including an angled flange extending circumferentially therearound.

* * * * *